United States Patent
Buchmann

(10) Patent No.: US 7,284,866 B2
(45) Date of Patent: Oct. 23, 2007

(54) STABILIZED IMAGE PROJECTING DEVICE

(75) Inventor: Michael Buchmann, Duisburg (DE)

(73) Assignee: Nokia Corporation, Espoo (FI)

( * ) Notice: Subject to any disclaimer, the term of this patent is extended or adjusted under 35 U.S.C. 154(b) by 244 days.

(21) Appl. No.: 11/030,566

(22) Filed: Jan. 5, 2005

(65) Prior Publication Data

US 2006/0146015 A1 Jul. 6, 2006

(51) Int. Cl.
*G03B 21/00* (2006.01)

(52) U.S. Cl. .............................. 353/42; 353/46; 353/121

(58) Field of Classification Search ................... 353/39, 353/42, 46, 69, 70, 121; 345/156
See application file for complete search history.

(56) References Cited

U.S. PATENT DOCUMENTS

| | | | | |
|---|---|---|---|---|
| 4,956,655 | A | * | 9/1990 | Wakebe ........................ 353/101 |
| 6,764,185 | B1 | * | 7/2004 | Beardsley et al. ........... 353/122 |
| 2005/0280628 | A1 | * | 12/2005 | Adams et al. ............... 345/156 |
| 2006/0103811 | A1 | * | 5/2006 | May et al. ..................... 353/69 |

FOREIGN PATENT DOCUMENTS

| | | |
|---|---|---|
| DE | 10305497 | 8/2004 |
| JP | 2001221641 | 2/2000 |
| JP | 2004247804 | 9/2004 |
| WO | WO 0028370 | 5/2000 |

* cited by examiner

*Primary Examiner*—Rodney Fuller
(74) *Attorney, Agent, or Firm*—Alfred A. Fressola; Ware, Fressola, Van Der Sluys & Adolphson LLP

(57) ABSTRACT

A handheld projecting device is adapted to project an image and a pointer pattern on an external surface. The projecting device comprises a sensor to detect the movements of the projecting device and means to dampen the movements of the projected image, based on the detected movements of the projecting device. When the handheld projecting device is turned, the position of the projected image is kept substantially stationary whereas the pointer pattern moves on the projected image to indicate a point of the projected image. In an embodiment, the pointer pattern may be used to make a selection between graphically displayed options.

25 Claims, 14 Drawing Sheets

STABILIZED IMAGE PROJECTING DEVICE

The present invention relates to a method to project an image on an external surface. The present invention relates also to a mobile device adapted to project an image on an external surface. Further, the present invention relates also to a system comprising a projecting device, which device is adapted to project an image on an external surface. The invention also relates to a computer program and a computer program product to implement the method according to the invention.

BACKGROUND OF THE INVENTION

An image displayed by an image projecting device may become blurred when the device is subject to vibrations. Especially, an image displayed by a handheld image projecting device vibrates according to the shaking of a hand holding the device. Typically, human hands tremble at least a little.

The vibrations of the projected image may be reduced or eliminated by sensing the movements of the projecting device and by adjusting the position of the projected image, respectively.

Patent publication JP2001221641 discloses a projection apparatus with a damping function. The apparatus comprises a laser gyroscope, to detect the angular velocity of the projection apparatus. The apparatus comprises also a deformable optical prism to adjust the position of the projected image. The prism is controlled based on the angular velocity to prevent motional blurring of the projected image.

SUMMARY OF THE INVENTION

It is an object of the present invention to provide a handheld projecting device capable of projecting an image and a movable pointer pattern on an external surface.

According to a first aspect of the invention, there is a mobile device adapted to optically project at least a first image and a pointer pattern on an external surface, said mobile device comprising at least:
a sensor to provide movement information related to angular movement of said mobile device with respect to an external reference, and
a control unit to move the position of said first image with respect to said pointer pattern according to said movement information such that the relative movement of said first image with respect to said external reference is substantially smaller than the relative movement of said pointer pattern with respect to said external reference.

According to a second aspect of the invention, there is a method to project an image on an external surface, said method comprising at least:
optically projecting at least a first image and a pointer pattern on said external surface using a handheld projecting device,
providing movement information related to the angular movement of said projecting device with respect to an external reference, and
adjusting the position of said first image with respect to said pointer pattern according to said movement information such that the relative movement of said first image with respect to said external reference is substantially smaller than the relative movement of said pointer pattern with respect to said external reference.

According to a third aspect of the invention, there is a system comprising at least
a handheld projecting device, and
further apparatus adapted to communicate with said projecting device, said handheld projecting device being adapted to optically project at least a first image and a pointer pattern on an external surface, said projecting device comprising at least:
a sensor to provide movement information related to the angular movement of said projecting device with respect to an external reference, and
a control unit to move the position of said first image with respect to said pointer pattern according to said movement information such that the relative movement of said first image with respect to said external reference is substantially smaller than the relative movement of said pointer pattern with respect to said external reference.

According to a fourth aspect of the invention, there is a computer program for a projecting device adapted to project a first image and a pointer pattern on an external surface, said computer program comprising at least computer program code sections for
controlling the projection of at least said first image on said external surface,
providing movement information related to the angular movement of said projecting device with respect to an external reference, and
adjusting the position of said first image with respect to said pointer pattern according to said movement information such that the relative movement of said first image with respect to said external reference is substantially smaller than the relative movement of said pointer pattern with respect to said external reference.

According to a fifth aspect of the invention, there is a computer program product comprising a computer program for a projecting device adapted to project a first image and a pointer pattern on an external surface, said computer program comprising at least computer program code sections for
controlling the projection of at least said first image on said external surface,
providing movement information related to the angular movement of said projecting device with respect to an external reference, and
adjusting the position of said first image with respect to said pointer pattern according to said movement information such that the relative movement of said first image with respect to said external reference is substantially smaller than the relative movement of said pointer pattern with respect to said external reference.

The pointer pattern may be moved by turning the projection device. Advantageously, the angular orientation of the pointer pattern is fixed with respect to the projecting device.

Advantageously, the position of the first image is kept stationary with respect to said external surface, i.e. the projection screen, while the projecting device is turned or moved by an user. In other words, the position of the image is decoupled from the movements of the projecting device, while the position of the pointer pattern is coupled to the movements of the projecting device.

The projecting device according to the present invention may be used to display graphical information in improvised visual presentations. A movement or shaking of a hand holding the projecting device does not cause substantial movement or motional blurring of the projected first image. Thus, the projecting device may be used without a stable base. A spot or location on the projected first image may be pointed by moving the pointer pattern to said point by turning the projecting device.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings, in which.

DETAILED DESCRIPTION OF THE INVENTION

Figure 1A:
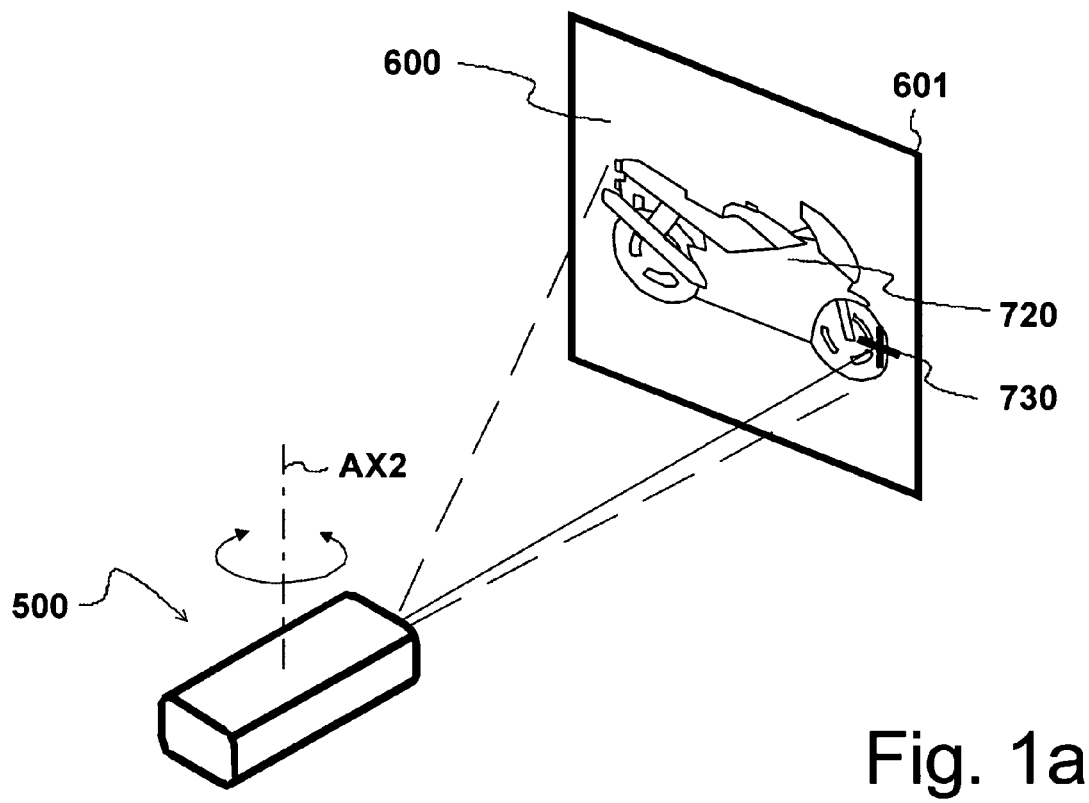
FIG. 1a shows schematically a projecting device according to the present invention, a first image projected on a screen and a pointer pattern projected on the screen.

Referring to FIG. 1a, the projecting device 500 according to the present invention is adapted to optically project an image, herein called as the first image 720, on an external surface. The external surface may be e.g. a special screen 600 or for example, a plain wall. The first image 720 may be e.g. an image of a motorcycle, as shown in FIG. 1a.

The projecting device 500 is a handheld device which may be turned and/or moved. The projecting device 500 may be turned e.g. about an axis AX2.

The projecting device 500 and the first image 720 have positions, which may be determined with respect to an external reference. When the projecting device 500 is turned and/or moved, its orientation changes with respect to the external reference, i.e. it exhibits an angular movement with respect to said external reference. The external reference may be e.g. a visual feature of the environment. For example a corner 601 of the screen 600 may serve as the external reference.

The projecting device 500 comprises means to provide position information related to the angular movement of the projecting device 500 with respect to the external reference. Further, the projecting device 500 comprises means to adjust the position of the first image 720 according to said position information to dampen the movements of the first image 720. When the projecting device 500 is turned and/or moved, the position of the first image 720 moves substantially less than what would correspond to the angular movement of the projecting device 500. Advantageously, the position of the first image 720 is adapted to remain stationary with respect to the external reference.

The projecting device 500 comprises also means to project a pointer pattern 730 on said external surface, in addition to the first image 720. The pointer pattern 730 may have any suitable shape, e.g. it may be an arrow, a cross hair pattern, dot, or a pointed finger pattern. In FIG. 1a, the pointer pattern 730 is a cross pattern.

When the projecting device 500 is turned and/or moved, the position of the first image 720 moves a first distance, or remains stationary, whereas the position of the pointer pattern 730 moves a second distance. According to the present invention, the first distance is substantially shorter than the second distance. In other words, the position of the first image 720 is adjusted such that a relative movement of said first image 720 with respect to said external reference is substantially smaller than a relative movement of said pointer pattern 730 with respect to said external reference. This provides a way to move the pointer pattern 730 with respect to the first image 720, by turning and/or moving the projecting device 500.

The pointer pattern 730 may be used to indicate a location on the first image 720. In FIG. 1a, the pointer pattern 730 indicates the front wheel of the motorcycle image 720.

Advantageously, the position of the first image 720 is substantially decoupled from the movements of the projecting device 500, whereas the position of the pointer pattern 730 is coupled to the movements of the projecting device 500.

According to an aspect of the present invention, the projecting device 500 may be a mobile device which is adapted to project the first image 720.

Figure 1B:
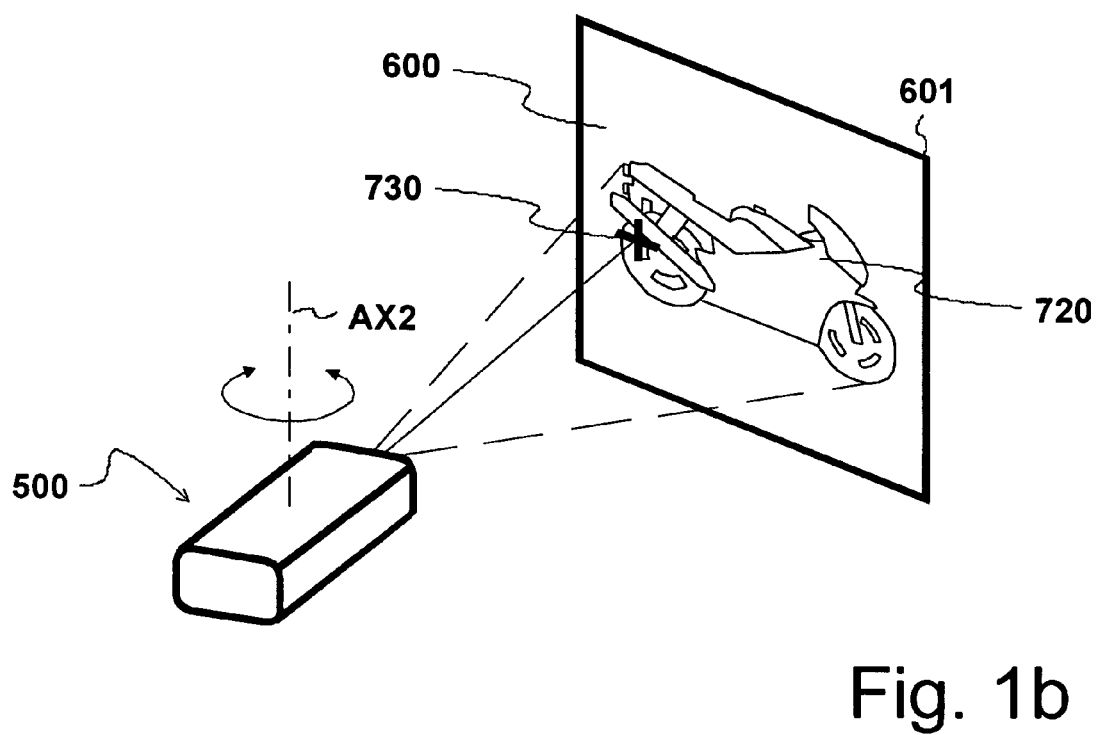
FIG. 1b shows schematically a projecting device according to the present invention, a first image projected on a screen and the pointer pattern projected on the screen, said pointer pattern indicating a different location of the first image than in FIG. 1a, FIG. 1c shows schematically a way to define the angular position of the projecting device with respect to an external reference.

Referring to FIG. 1b, the projecting device 500 may be turned e.g. about the axis AX2 to move the pointer pattern 730 to a new position, while keeping the position of the first image 720 fixed with respect to the corner 601 of the screen 600. In FIG. 1b, the projecting device 500 has been turned to indicate the rear wheel of the motorcycle image 720 with the pointer pattern 730.

Figure 1C:
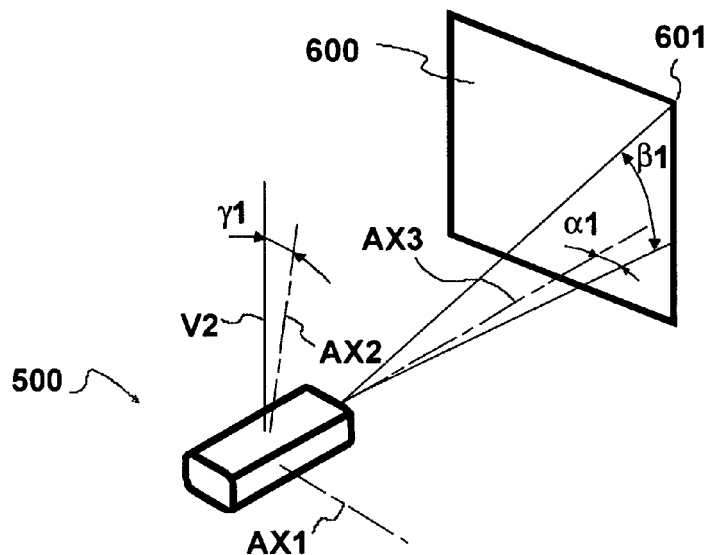

Referring to FIG. 1c, axes AX1, AX2 and AX3 are orthogonal and fixed with respect to the exterior of the projecting device 500. A line V2 is parallel to the vertical edges of the screen 600. The angular position of the projecting device 500 with respect to the upper right corner 601 of the external screen 600 may be defined by two angles α1, and β1. Turning of the projecting device 500 about the axis AX2 is associated with a change of the yaw angle α1. Turning of the projecting device 500 about the axis AX1 is associated with a change of the pitch angle β1. Turning of the projecting device 500 about the axis AX3 is associated with a change of a roll angle γ1, which is the angle between the line V2 and the axis AX2. Further, a linear movement of the projecting device 500 in the direction perpendicular to V2 may cause a change in the yaw angle α1 and a linear movement of the projecting device 500 in the direction parallel to V2 may cause a change in the pitch angle β1

Figure 2:
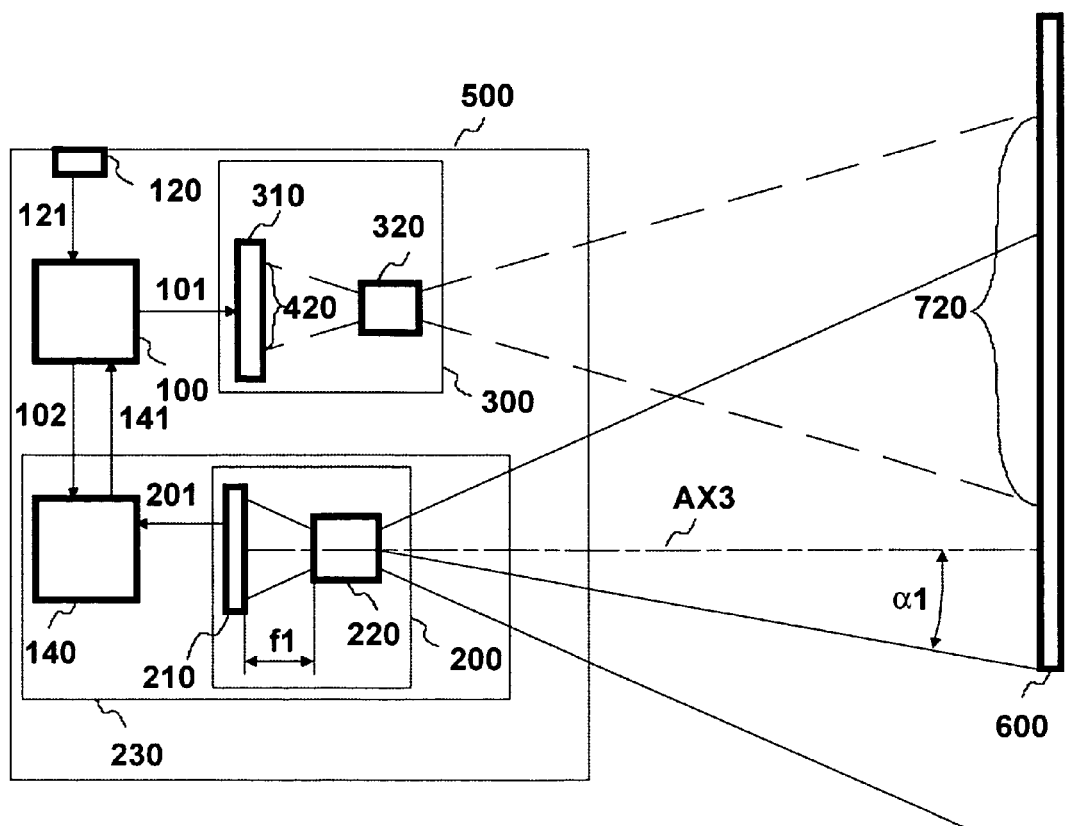
FIG. 2 shows schematically an embodiment of the invention in which an optical movement sensor and electronic adjustment of image position is applied.

The yaw angle α1, the pitch angle β1 and the roll angle γ1 define the angular orientation of the projecting device 500 with respect to the upper right corner 601 and the edges of the screen 600, respectively Referring to FIG. 2, the projecting device 500 may comprise an optical sensor unit 230 to provide position information related to the angular orientation of the projecting device 500 with respect to the external reference. In the embodiment shown in FIG. 2, the optical sensor unit 230 comprises an image acquisition unit 200 to monitor the angular positions of one or more external features, which serve as the external reference. In FIG. 2, the edge of the screen 600 is used as the external reference. The yaw angle α1 shown in FIG. 2 is one of the parameters specifying the angular position. The image acquisition unit 200 may be implemented using a detector array 210 and imaging optics 220. The imaging optics 220 forms an image of the external reference on the detecting surface of the detector array 210.

The detector array 210 may be based on e.g. charge coupled device (CCD) technology. An image analysis unit 140 is adapted to analyze the image acquired by the image acquisition unit 200, said image being transferred as a signal 201 to the image analysis unit 140. The image analysis unit 140 provides a position signal 141. The position signal 141 may comprise information related to at least one or more of the following: the yaw angle α1, the pitch angle β1 and the roll angle γ1. f1 denotes the focal distance between the detector array 210 and the imaging optics 220.

An image projecting unit 300 is adapted to project the first image 720 on the external screen 600. The image projecting unit 300 may be implemented using a micro display 310 and projecting optics 320. The micro display 310 may be, for example, an array of light emitting diodes, or it may be based on any emissive, transmissive or reflective display technologies. The term "micro" refers herein to a size which is smaller than the size of the projecting device 500. The position of the first image 720 may be changed electronically by changing the position of a primary image 420 displayed by the micro display 310.

The position signal 141 is coupled to a control unit 100. The control unit 100 is adapted to move the primary image 420 on the micro display 310 such that the position of the first image 720 is adjusted according to the angular position of the external reference. Advantageously, the position of the first image 720 is kept fixed with respect to the screen 600, while the projecting device 500 is moved and/or turned with respect to the screen 600.

The user may give commands to the projecting device 500 via a control interface 120, which in turn sends a control interface signal 121. The control interface 120 may comprise, for example, one or more push buttons.

In addition to the image of the external reference, a part of first image 720 may be received on the detector array 210, which may disturb the analyzing of the position of the external reference. Therefore the control unit 100 may send a signal 102 to the image analysis unit 130, which signal 102 may carry timing information, image data and/or commands. The first image 720 may be modulated or switched off for a period, which is short enough to remain undetected. The area of the detector array 210 which receives the image of the first image 720 may be ignored when analyzing the position. The disturbing portion of the image may be subtracted from the acquired image.

Figure 3:
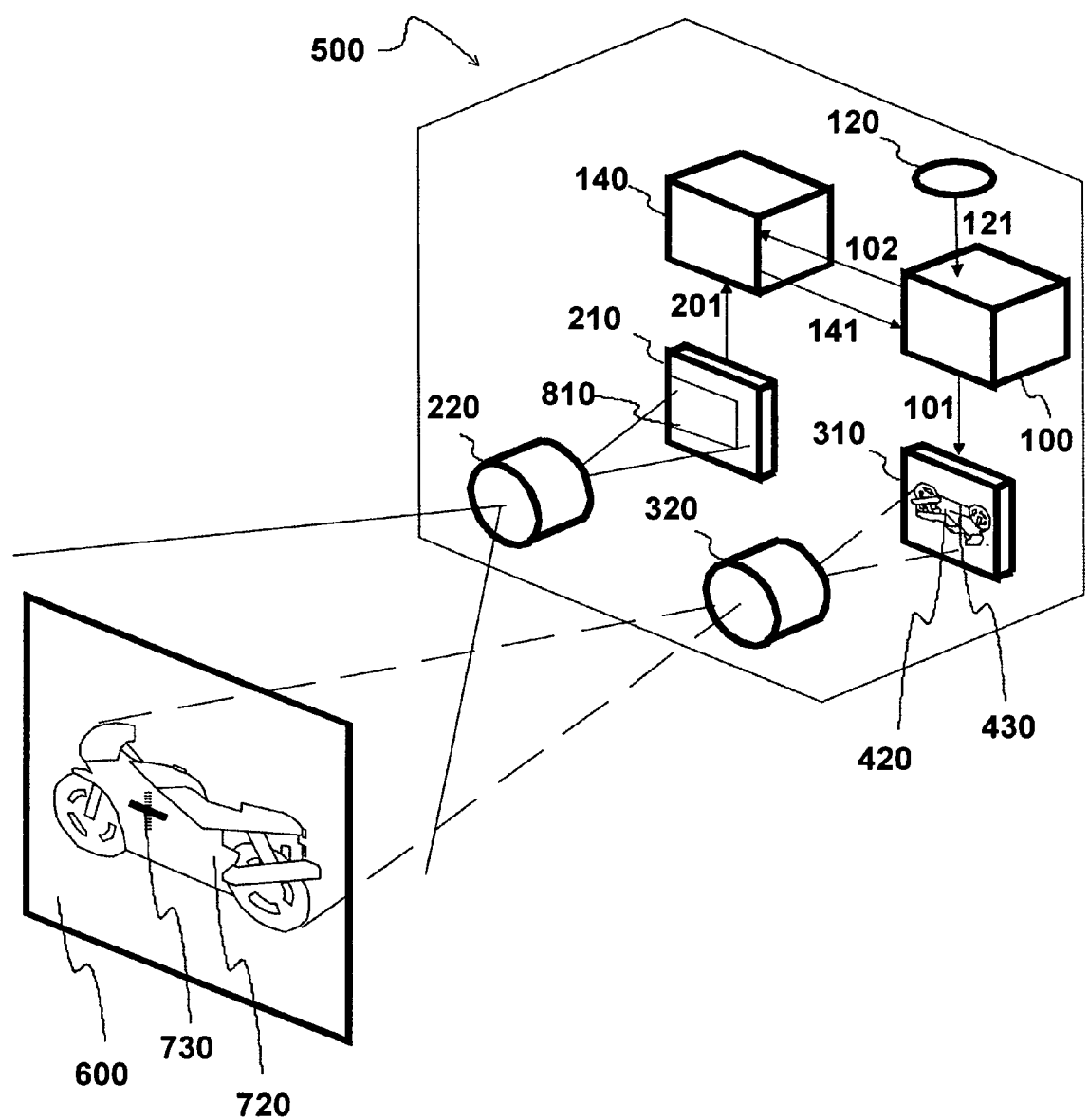
FIG. 3 shows schematically in a three-dimensional view an embodiment in which an optical movement sensor and electronic adjustment of image position is applied.

Referring to FIG. 3, the image received on the detector array 210 comprises a part of the image of the external screen 600. A part of the image of the first image 730 is also received on the detector array 210. The received image is analyzed by the image analysis unit 140, and the position information is provided to the control unit 100.

When the projecting device 500 is moved and/or turned, the position of the primary image 420 displayed on the micro display 310 is electronically shifted to dampen the movements or keep the position of the first image 720 stationary with respect to the screen 600.

The primary image 420 displayed on the display element 310 is typically upside-down with respect to the first image 720, due to the projection optics 320. For the same reason, the image received on the detector array 210 is typically upside-down.

The pointer pattern 730 may be generated using the same micro display 310 which is used for displaying the primary image 420. A primary pointer 430 may be displayed electronically on the micro display 310. Consequently, the pointer pattern 730 is projected on the first image 730. Advantageously, when the projecting device 500 is moved and/or turned, the position of the primary pointer 430 is kept substantially fixed with respect to the micro display 310. Thus, the pointer pattern 730 moves over the first image 720 when the projecting device 500 is turned and/or moved.

A projecting device 500 based on the optical sensor unit 230 is advantageously initialized before operation. The center of the projecting surface and the external reference should be selected and confirmed. The image analysis unit 140 may automatically analyze the acquired image and select e.g. a detected whitish rectangular region, if any, to be used as the external projection surface. Further, the image analysis unit 140 may analyze the acquired image and automatically select motionless features near said external surface to be used as external reference. The image analysis unit 140 may automatically select sharp corners of straight edges to be used as the external reference.

Figure 4A:
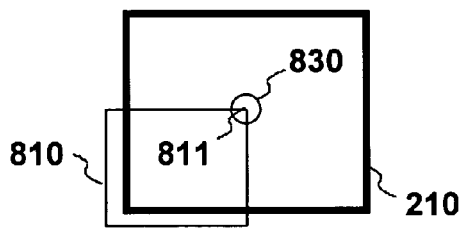
FIGS. 4a-4c show schematically an image of the screen as received on a detector array.
Figure 4B:
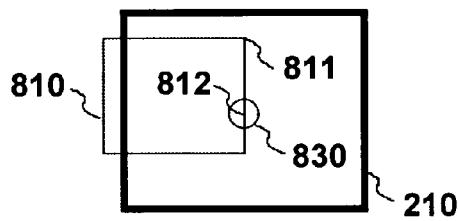
Figure 4C:
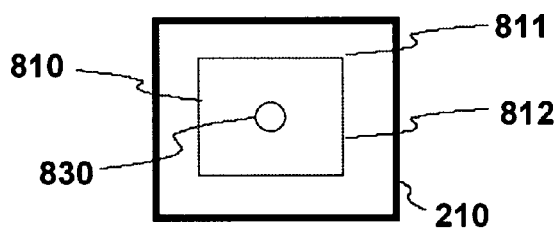

Alternatively, the center of the projection surface and the external reference features may be selected manually by the user, by pointing with the pointer pattern 730 and confirming the selection via the control interface 120. FIGS. 4a to 4c show an example of such procedure. FIG. 4a shows an image 810 of the screen 600, as received on the detector array 210. An image 830 of a dot-type pointer pattern 730 appears in the center. First, the projecting device 500 is turned such that the image 830 of the pointer pattern coincides with the image 811 of the corner 601 of the screen 600. The selection is subsequently confirmed via the control interface 120. Second, referring to FIG. 4b, the projecting device 500 is turned such that the image 830 of the pointer pattern coincides with a point 812 on the edge of the screen image 810. The selection is confirmed. Third, referring to FIG. 4c, the projecting device 500 is turned such that the image 830 of the pointer pattern coincides with the center of the screen image 710. The selection is confirmed.

Figure 5A:
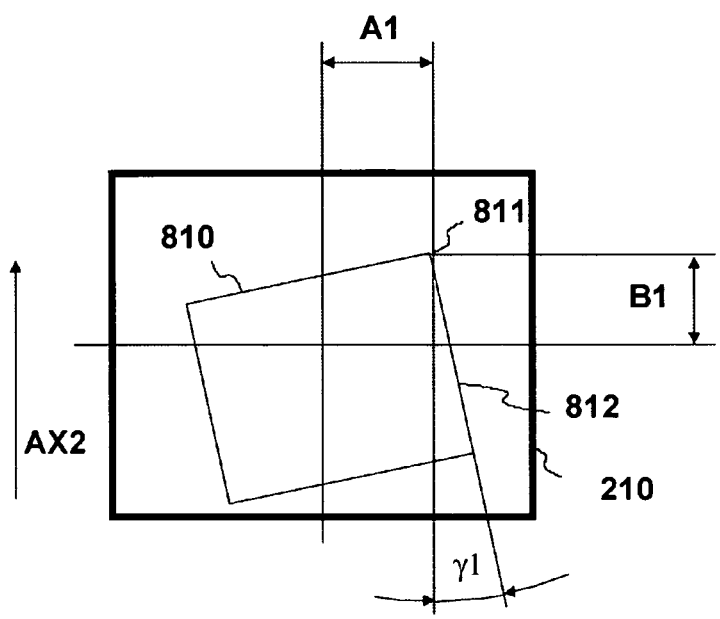
FIG. 5a shows schematically an image of the screen as received on a detector array, corresponding to a predetermined pitch, yaw and roll of the projecting device with respect to the screen.

FIG. 5a shows the position of the image 810 of the screen 600, as received on the detector array 210. The image analysis is greatly simplified when only the points 811 and 812 are considered.

Assuming that the axis AX3 (FIG. 1c) is parallel to the optical axis of the image acquisition unit 200, the angular position of the corner 601, i.e. the angular orientation of the projecting device 500 with respect to the corner 601 may be expressed based on the first coordinate A1 of the point 811 and the second coordinate B1 of the point 811 according to the following equations:

$$\alpha 1 = \arctan \frac{A1}{f1}, \text{ and} \quad (1)$$

$$\beta 1 = \arctan \frac{B1}{f1} \quad (2)$$

$\alpha 1$ is the yaw angle, $\beta 1$ is the pitch angle (FIG. 1c) and f1 is the focal distance (FIG. 2). The roll angle $\gamma 1$ may defined by the axis AX2 and a line intersecting the points 811 and 812.

Figure 5B:
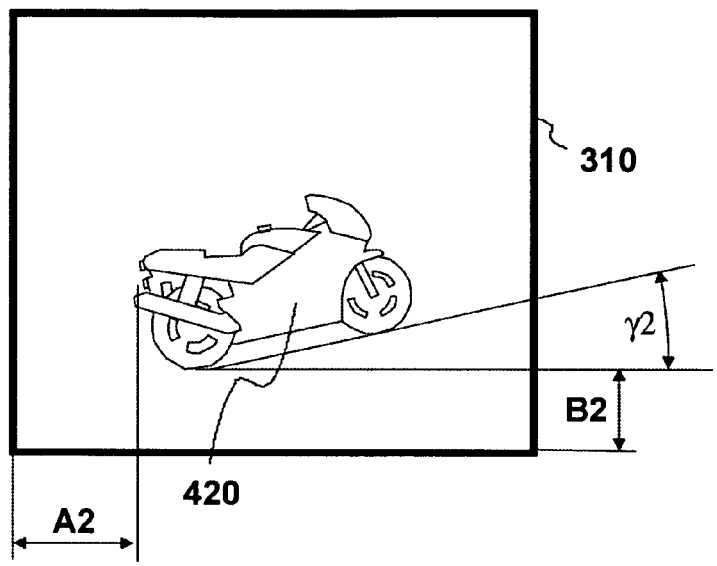
FIG. 5b shows schematically a primary image displayed on a display element.

FIG. 5b shows the position of the primary image 420 on the micro display 310. The horizontal position A2, the vertical position B2, and the angular orientation $\gamma 2$ of the primary image 420 are adjusted electronically by the control unit 100 (FIG. 3) on the basis of the position signal 141 (FIG. 3) such that the first image 720 is centered and aligned with respect to the screen 600.

Figure 5C:
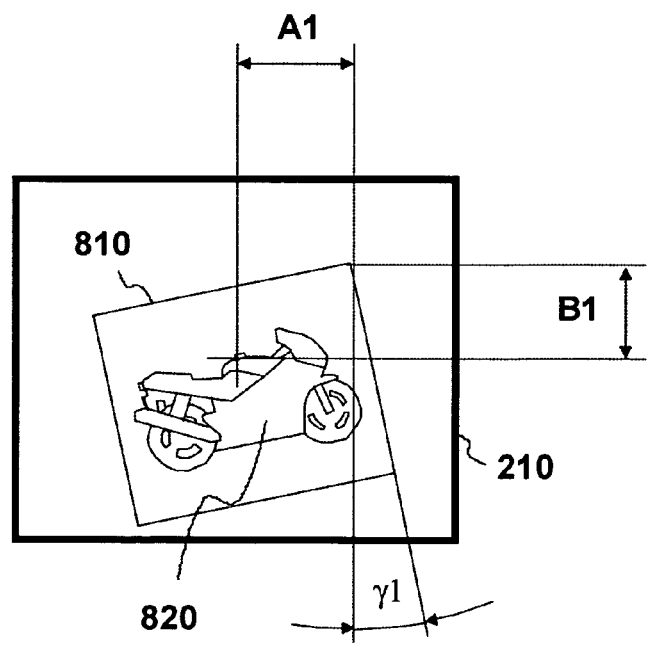
FIG. 5c shows schematically an image of the projected first image, as received on the detector array, after stabilization of the projected first image.
Figure 6A:
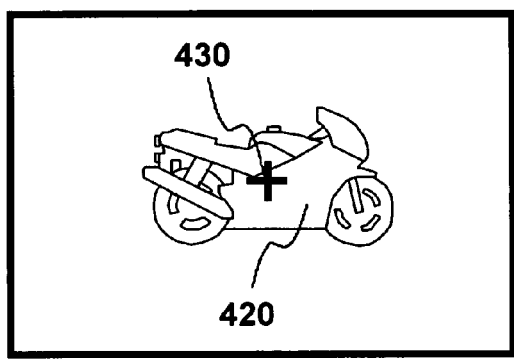
FIG. 6a shows schematically a primary image and a primary pointer displayed on a display element.
Figure 6B:
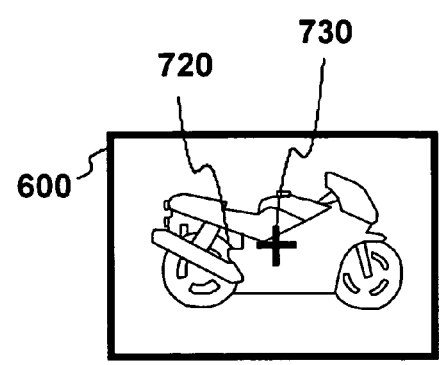
FIG. 6b shows schematically a projected first image and a pointer pattern corresponding to FIG. 6a, FIG. 6c shows schematically a primary image and a primary pointer displayed on a display element, the projecting device being turned when compared with FIG. 6a, FIG. 6d shows schematically a projected first image and a pointer pattern corresponding to FIG. 6c.

FIG. 5c shows an image received on the detector array 210, corresponding to FIGS. 6a and 6b. The image 810 of the screen 600 is inclined and shifted with respect to the detector array 210, but also the image 820 of the first image 720 is inclined and shifted such that the images 810 and 820 are aligned with each other.

Referring to FIGS. 6a to 6d, the movable pointer pattern 730 is projected on the screen 600.

Referring to FIG. 6a, the primary image 420 is displayed by the micro display 310. Further, the primary pointer 430 is displayed on the center of the micro display 310. In FIG. 6a, the primary pointer 430 is a cross pattern. Referring to FIG. 6b, the projected pointer pattern 730 appears on the center of the first image 720, when the primary image 420 and the primary pointer 430 according to FIG. 6a are projected on the screen 600.

Figure 6C:
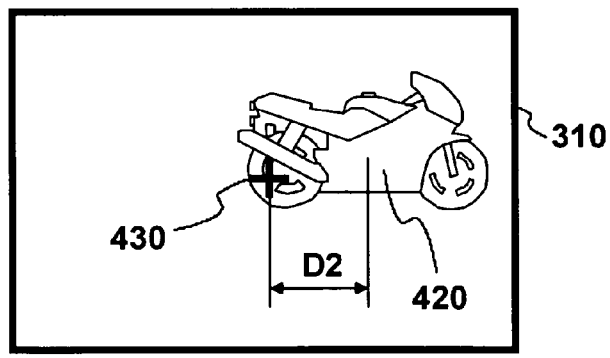

Referring to FIG. 6c, the primary image 420 is shifted electronically to keep the first image 720 in the center of the screen 600, when the projecting device 500 is turned. The position of the primary pointer 430 is advantageously fixed on the display element 310, and consequently the pointer pattern 730 moves over the screen 600 when the projecting device 500 is turned. The projecting device 500 may be turned such that the control unit 100 (FIG. 3) shifts the primary image 420 to the side of the display element 310. The location of the primary pointer 430, being in the center of the display element 310, is now over the rear wheel of the displayed motorcycle image 420.

Figure 6D:
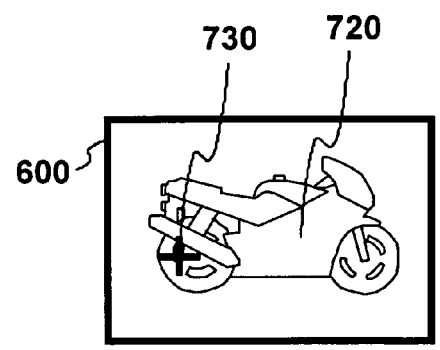

Referring to FIG. 6d, the projected pointer pattern 730 appears on the rear wheel of the projected motorcycle image 720, corresponding to the situation according to FIG. 6c and FIG. 1b. When FIGS. 6d and 6b are compared, the pointer pattern 730 is shifted with respect to the first image 720.

Figure 7A:
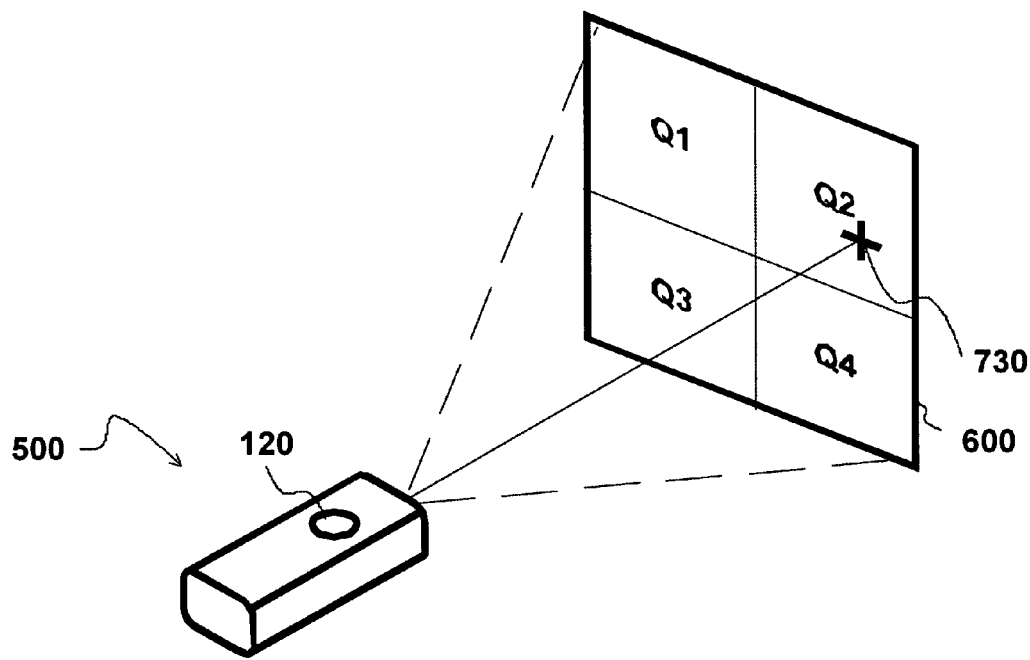
FIG. 7a shows schematically a pointer pattern which is used to make a selection between options.

Referring to FIG. 7a, the pointer pattern 730 may be used to select between action options, i.e. between user-selectable functions, and to confirm a selected option. The first image 720 may comprise one or more zones Q1, Q2, Q3, Q4. The zones Q1, Q2, Q3, Q4 may be associated with different options. The pointer pattern 730 may be moved to one of the zones, and the selection of the zone and the respective option may be subsequently accepted or rejected via the control interface 120 (FIG. 3). Therefore, the invention facilitates the use of menu selection using the pointer pattern 730 as a selection indicator.

The control unit 100 adjusts the position of the first image 720 and the position of the pointer pattern 730. Thus, the control unit 100 comprises accurate information about the relative position of the pointer pattern 730 with respect to the first image 720.

The control interface 120 may be a single push button or a plurality of buttons and knobs. The control interface 120 may also be based on voice recognition.

The control unit 100 may comprise further signal processing means to interpret certain types of movements as commands. For example, the combination of moving the pointer pattern 730 to a predetermined relatively small area and keeping the projecting device 500 stationary for a few seconds may be interpreted to confirm a selection.

Further, a predetermined or taught combination of movements (e.g. a fast up and down variation of the pitch angle $\beta 1$, analogous to human nodding) may be used to confirm a selection. Further, a predetermined or taught movement pattern (e.g. a fast left and right variation of the yaw angle $\alpha 1$, analogous to the human gesture expressing "no") may be used to reject or cancel a selection. A given command is advantageously associated with an earlier stable position of the pointer pattern 730.

Figure 7B:
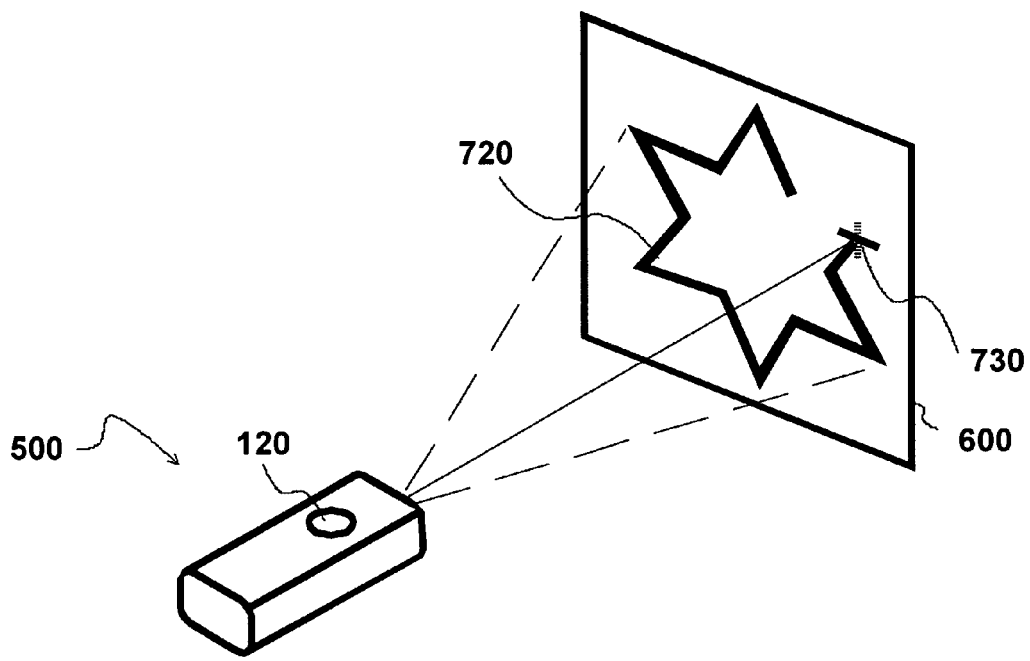
FIG. 7b shows schematically a pointer pattern which is used to draw a figure.

Referring to FIG. 7b, the projecting device 500 may also be used to draw a figure or a pattern 720 on the screen 600, e.g. a star pattern. The path traveled by the pointer pattern 730 may be memorized by the control unit 100, and the color of said path may be selected by a command received via the command interface 120.

Figure 8:
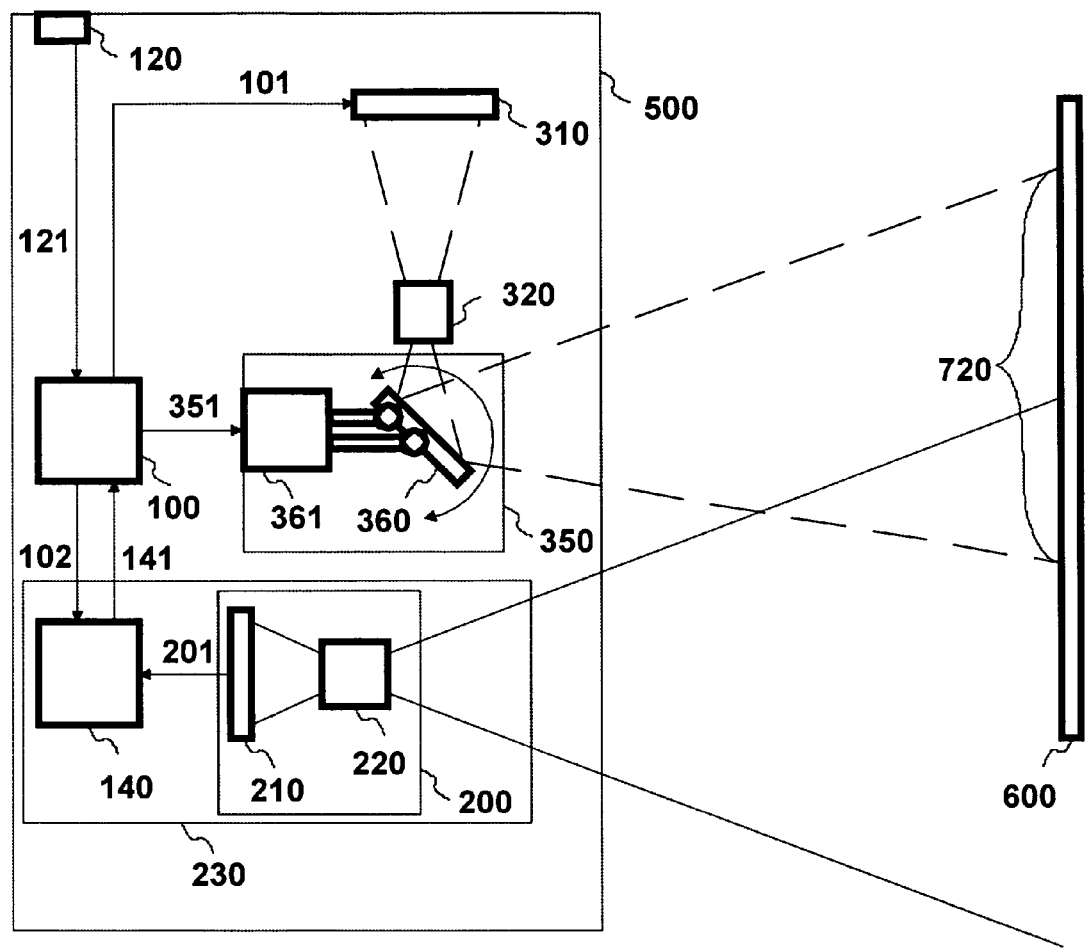
FIG. 8 shows schematically an embodiment of the present invention based on mechanical positioning of the projected first image.

Referring to FIG. 8, the position of the first image 720 on the screen 600 may also be adjusted mechanically.

The image acquisition unit 200 and the image analysis unit 140 are adapted to send a position signal 141 to the control unit 100. A mechanical image positioning unit 350 may comprise a turning mirror 360 which is mechanically coupled to an actuator 361. The control unit 100 may be adapted to send a signal 351 to the image positioning unit 350 to keep the position of the first image 720 fixed with respect to the screen 600 while the projecting device 500 is turned.

When the primary image 420 is moved electronically, the micro display 310 should be considerably larger than the primary image 420 to allow headroom for the shifting. An advantage with mechanical image positioning is that the size of the primary image 420 may be substantially equal to the size of the display element 430.

When mechanical image positioning is used, and the pointer pattern 730 is projected using the same micro display 310 which is used for displaying the primary image 420, the position of the primary pointer 430 should be shifted electronically on the micro display 310 to move the pointer pattern 730 with respect to the first image 720.

Figure 9A:
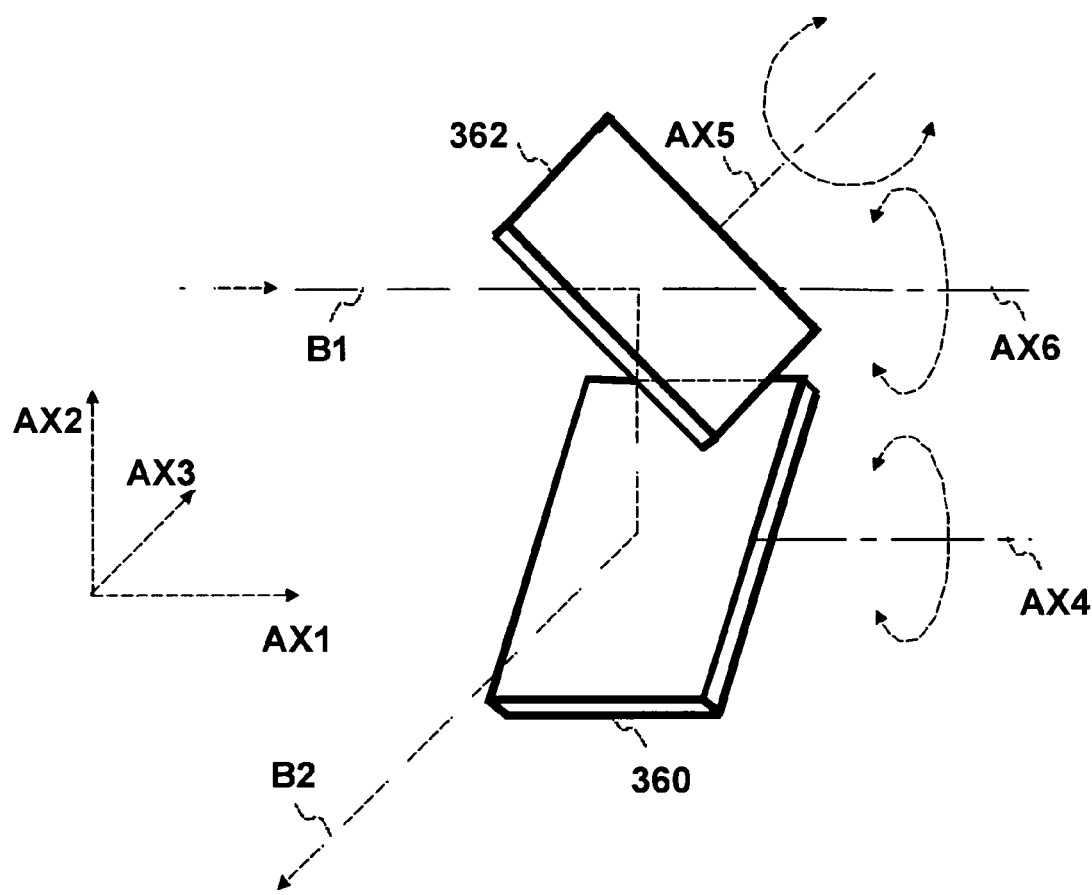
FIG. 9a shows schematically a mirror arrangement for mechanical positioning of the projected first image.

FIG. 9a shows an arrangement of rotating mirrors 360, 362 for use in a mechanical image positioning unit 350. The axes AX1, AX2 and AX3 are as shown in FIG. 1c. Axes AX4 and AX6 are parallel to the axis AX1 and an axis AX5 is parallel to the axis AX3. The reflection of a light beam B1 on the mirror surfaces is discussed. First, the beam B1 is substantially parallel to the axis AX1. Second, the beam B1 is reflected from the first mirror 362 towards the second mirror 360. Third, the beam B1 is further reflected from the second mirror 360, and a beam B2 exits towards a direction substantially parallel to the axis AX3. The horizontal orientation of the beam B2 may be adjusted by rotating the mirror 362 about the axis AX5, and the vertical orientation may be adjusted by rotating the mirror 360 about the axis AX4. The horizontal and vertical positions of the first image 720 may be adjusted respectively, when projected light is reflected by the mirrors 360, 362. Rotation of the mirror 362 about the axis AX5 causes combined rotation and shifting of the first image 720. The mirrors 360, 362 may be rotated using one or more actuators 361 (FIG. 8).

Figure 9B:
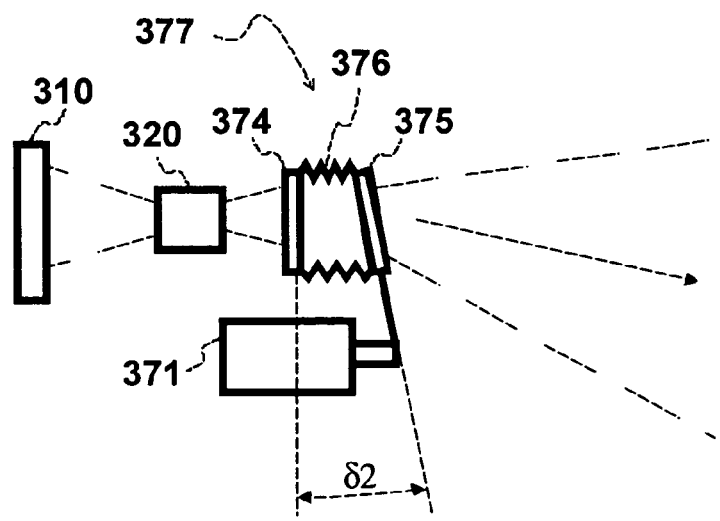
FIG. 9b shows schematically a deformable prism for mechanical positioning of the projected first image.

Referring to FIG. 9b, the position of the first image 720 may be adjusted using a mechanically deformable prism 377. The prism comprises a cavity defined by two windows 374, 375 and bellows 376. The cavity is filled with a transparent fluid. A prism angle $\delta 2$ between the windows 374, 375 may be varied using one or more actuators 371. The prism 377 modifies the optical path length of the projected light, and causes refraction in horizontal and vertical directions, according to the prism angle $\delta 2$.

Figure 9C:
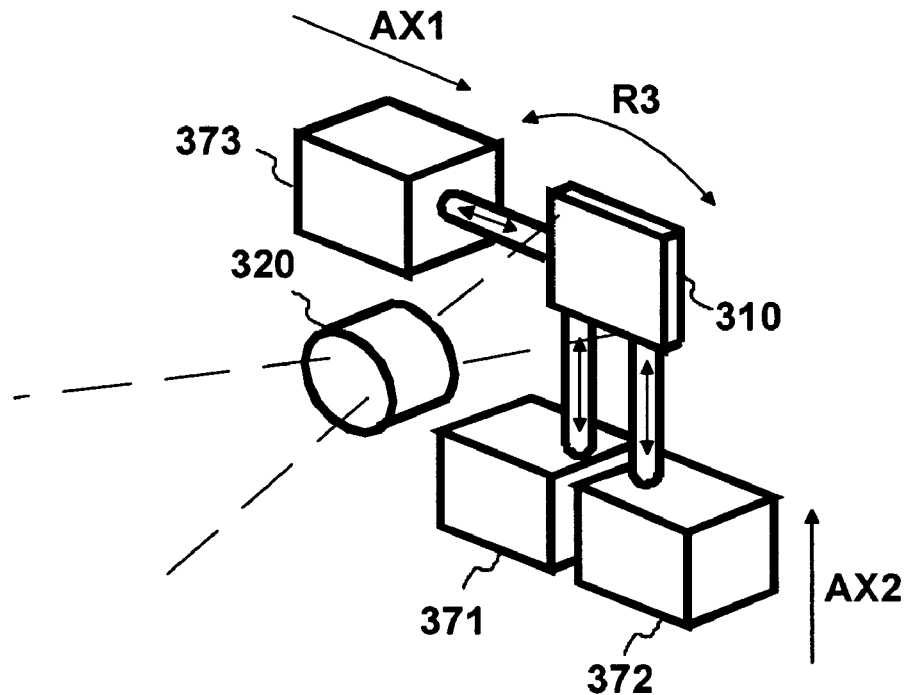
FIG. 9c shows schematically the mechanical positioning of the projected first image by moving a micro display.

Referring to FIG. 9c, the position of the first image 720 may be adjusted by moving the micro display 310 with respect to the projecting optics 320. The micro display 310 may be moved in directions parallel to the axes AX1 and AX2 by actuators 371, 372, 373. A differential movement of the actuators 371 and 372 may be used to realize a rotational movement R3.

Figure 9D:
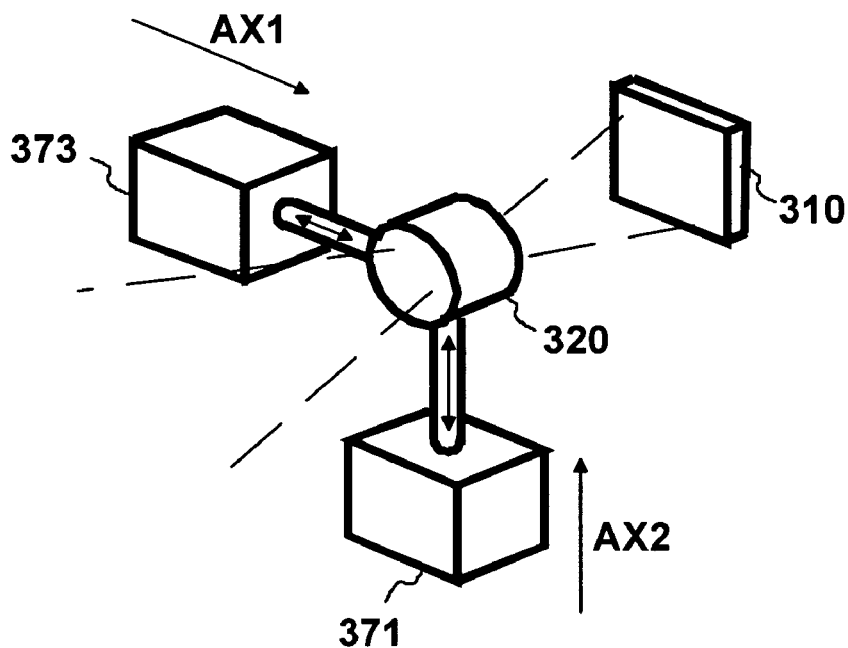
FIG. 9d shows schematically the mechanical positioning of the projected first image by moving a lens of the projecting optics.

Referring to FIG. 9d, the position of the first image 720 may be adjusted by moving the projecting optics 320 with respect to the micro display 310. The micro display 310 may be moved in directions SX and SY by actuators 371, 373.

Figure 9E:
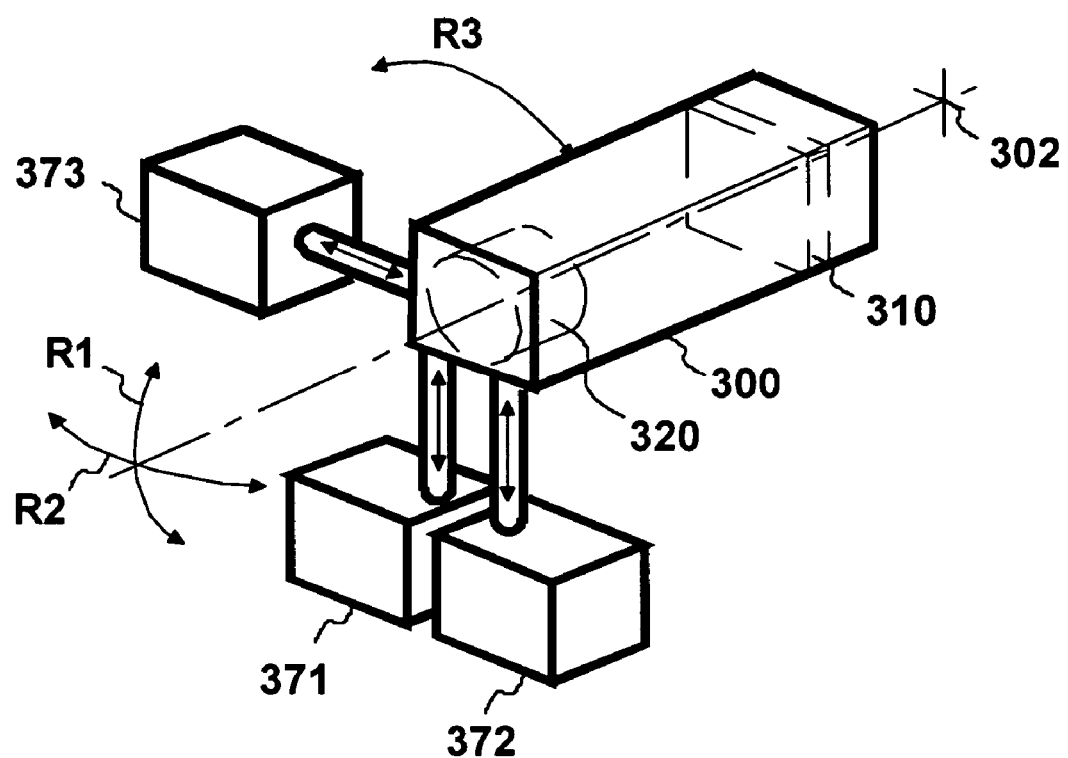
FIG. 9e shows schematically a image projecting unit with adjustable alignment for mechanical positioning of the projected first image.

Referring to FIG. 9e, the position of the first image 720 may be adjusted by turning the image projecting unit 300 with respect to a rotation point 302. The image projecting unit 300 may be turned using actuators 371, 372, 373. The rotation point 302 may be implemented using a ball joint. Three rotational movements R1, R2 and R3 may be realized, corresponding to rotational movements about the axes AX1, AX2, AX3, respectively. The image projecting unit may also be mounted on a gimbal mount.

The mechanical means shown in FIGS. 9b and 9d do not allow rotation of the first image about the axis AX3 (FIG. 1c). In other words variations of the roll angle $\gamma 1$ can not be compensated using the mechanical means according to FIGS. 9b and 9d. When required, electronic rotation the image may be combined with mechanical adjustment of the image position.

An optical component called a dove prism may also be used for the rotation of the image about the axis AX3. The dove prism may be rotated by an actuator.

Figure 10:
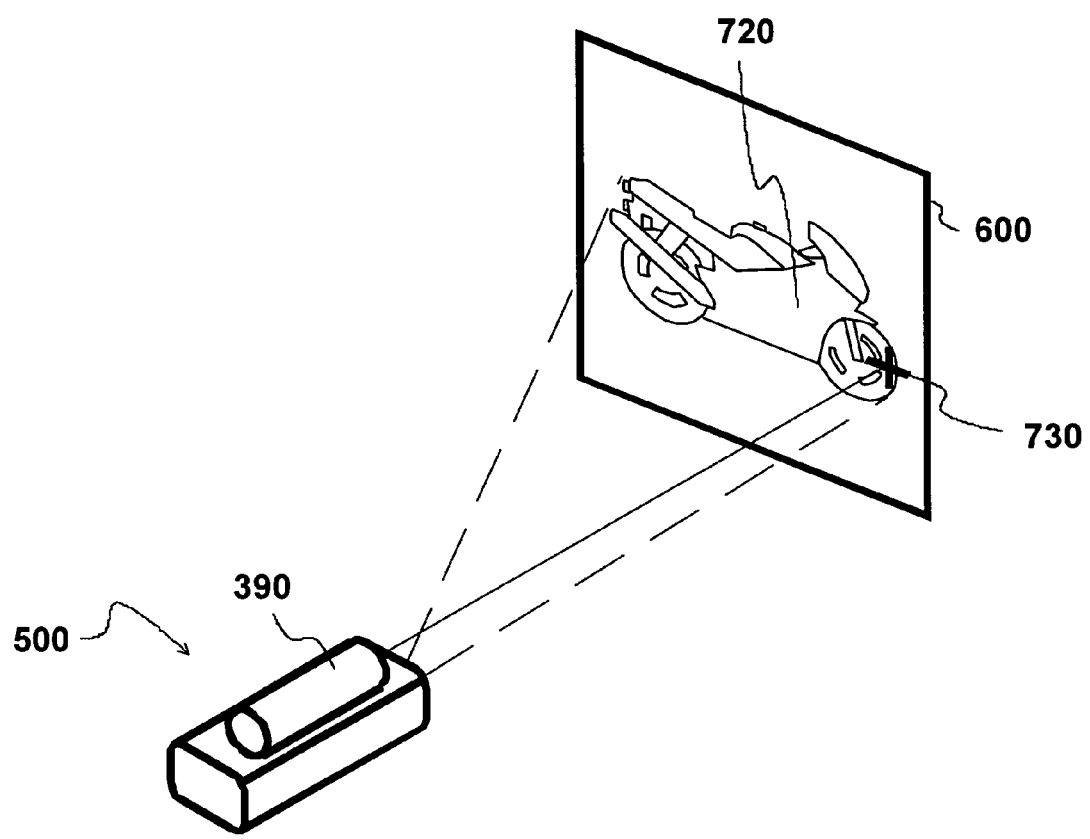
FIG. 10 shows schematically a projecting device comprising a an emissive pointer unit.

Referring to FIG. 10, the projecting device 500 may further comprise a an emissive pointer unit 390 to project the pointer pattern 730 on the screen 600. The pointer unit 390 may be, for example, a laser pointer attached to the projecting device 500. Advantageously, the orientation of the pointer unit 390 is fixed with respect to the exterior of the projecting device 500. The emissive pointer unit 390 may also be implemented using a light emitting diode and a lens system.

Figure 11:
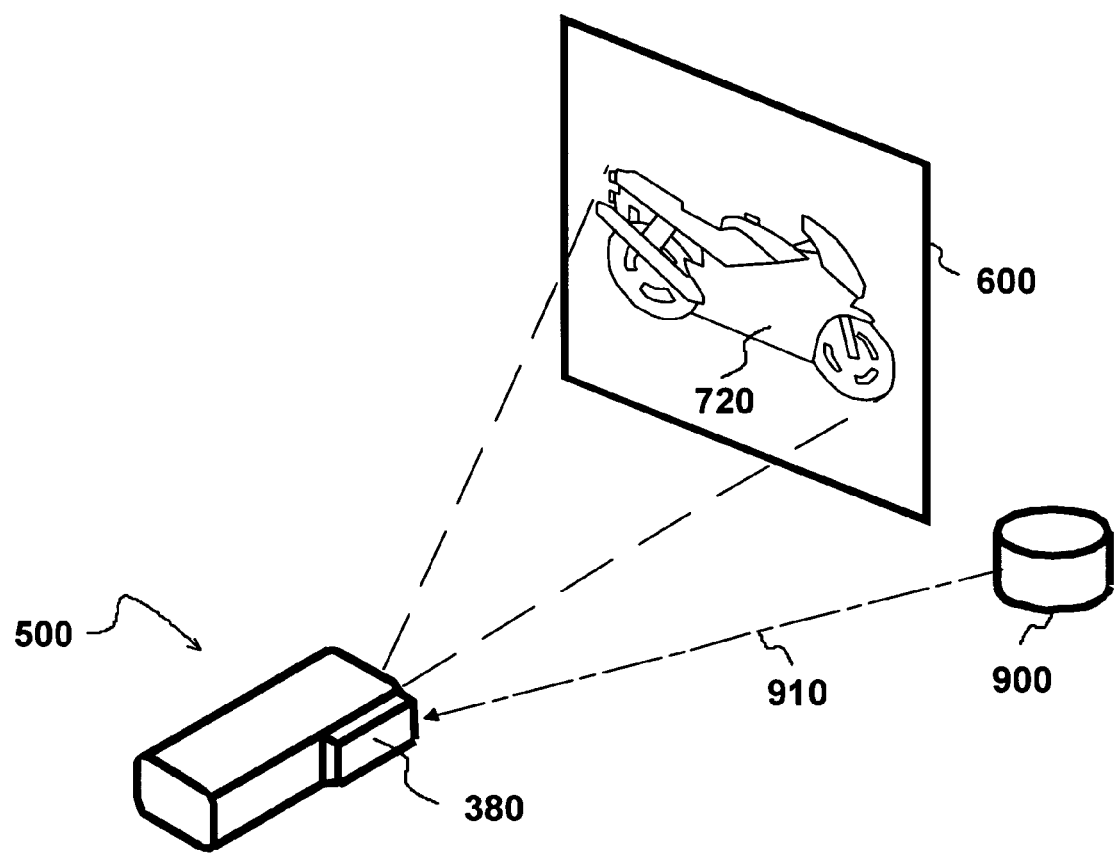
FIG. 11 shows schematically a system comprising a projecting device and a data link pod.

Referring to FIG. 11, a multimedia presentation system may comprise the projecting device 500 and a data link pod 900. The image acquisition unit 200 of the projecting device 500 is advantageously adapted to monitor the position of the pod 900 with respect to the projecting device 500. Thus, the pod 900 may serve as the external reference. To facilitate positioning, The pod 900 may be adapted to emit visible, infrared or ultraviolet light. The pod 900 may emit light pulses which are so short that they are invisible to human eyes.

The pod 900 may comprise data transmitting and/or receiving means to communicate with the projecting device 500. Data may be transferred by a modulated light signal, by radio-frequency signal, e.g. a so-called Bluetooth signal or via Wireless Local Area Network (WLAN). The projecting device 500 may also comprise a microphone and the pod 900 may comprise an amplifier and a loudspeaker to amplify the voice of the person making a presentation.

The projecting device 500 may be a part of an internet-based or an mobile network-based communication system. The projecting device 500 may be connected to the internet to receive information, which is projected on the screen 600 in real time. The pod 900 may serve as a data link between the projecting device 500 and the internet. The pod 900 may serve as a data link between the projecting device 500 and a television network.

Referring back to FIGS. 2 and 3, the image acquisition unit 200 may be a digital camera. The detector array 210 may be implemented using charged coupled device (CCD) technology, or complementary metal oxide semiconductor technology (CMOS). The detector array 210 may also be implemented using silicon photodiodes. Advantageously, the detector array 210 comprises detecting elements in two dimensions to acquire a two-dimensional image. The detector array 210 may also comprise detecting elements in one dimension to acquire one-dimensional images. There may be one or more detector arrays 210.

The image analysis unit 140 and the control unit 100 may be implemented by microprocessor technology.

The micro display 310 may be a reflective, emissive or transmissive two-dimensional light modulating array. The display element may be an array of light-emitting diodes (LED, Organic Light Emitting Diode), an array of micromechanical mirrors (also known as a DMD display, digital micromirror device, or MEMS display), or an array of liquid crystal cells.

Advantageously, the projection optics 320 and the imaging optics 220 comprise wide-angle lenses to maximize the angular range in which the positions of the first image 720, the screen 600 and/or the external reference may be with respect to the projecting device 500.

The external surface is not a part of the projecting device. The external surface is a passive screen, i.e. it does not comprise any active components such as cathode ray tubes, liquid crystal cells or light emitting diodes.

An image of the first image 720 is at least partly received by the image acquisition unit 200. Therefore the adjustment of the focusing distance of the image projecting unit 300 may be based on optimizing the sharpness of the received image. Entropy-based autofocus algorithms may be employed. The projecting device 500 may further comprise means to measure a distance between the projecting device 500 and the screen 600, in order to focus the first image 720 and the image acquisition unit 200.

A projected image is typically deformed, when the image is projected at an inclined angle with respect to the projection surface. The positions of the corners and/or edges of the screen 600 may be monitored, and the form of the projected first image 720 may be corrected by deforming the primary image 420 in an inverse way.

The projecting device 500 may be adapted to display feedback and/or operating instructions for the user.

Advantageously, when using the optical position sensor 230, the visual features of the external projection screen 600 are advantageously used as the external reference. However, a table, chair, door, window, corner of a room, or wallpaper pattern may be used as the external reference.

Non-human motionless features may be used as external references. For special effects, the optical sensor unit 230 may be adapted to monitor the position of a person or a moving human hand. The position of the projected first image 720 may follow the movements of the person or the hand. Further, a white shirt of said person or said hand may be used as a movable projection surface.

Advantageously, the shape of the pointer pattern 730 may be easily changed by software means, according to the situation.

As people are used to handle conventional wooden, plastic or laser pointers, the angular orientation of the pointer pattern 730 is advantageously fixed with respect to the exterior of the projecting device 500. Thus, minimum amount of adaptation or practicing is required. However, the angular position of the pointer pattern 730 may also be adapted to vary with respect to the exterior of the projecting device 500. For example, the angular position of the pointer pattern may be adapted to change only 5 degrees when the device is turned by 10 degrees. This reduces the shaking of the pointer pattern 730 due to the trembling of the hand and improves positioning accuracy.

To implement a special effect, the roles of the first image 720 and the pointer pattern 730 may be interchanged: The position of the pointer pattern 730 may remain substantially constant with respect to the screen 600, while the first image 720 is moved over the pointer pattern 730.

Figure 12:
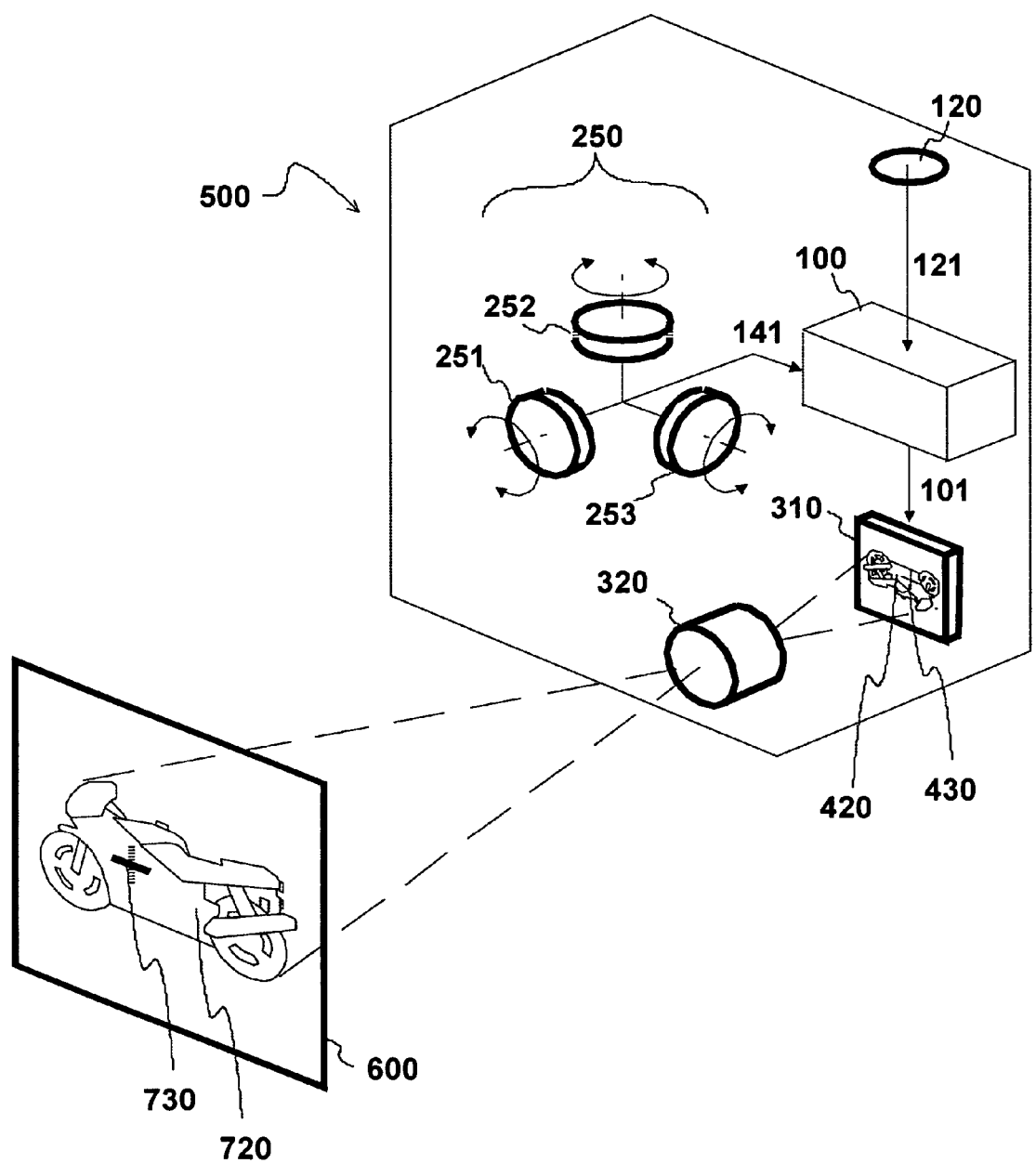
FIG. 12 shows schematically a stabilized projecting device comprising inertial sensors.

Referring to FIG. 12, the projecting device 500 may comprise an inertial sensor unit 250 to provide movement information. The sensor unit 250 may comprise one or more sensors 251, 252, 253 to sense angular velocity and/or angular acceleration. The sensors may be laser gyroscopes, piezo-gyroscopes (based on coriolis effect), or mechanical bodies with high spinning velocity (gyrostatic stabilization). Monitoring the relative position of a floating mass, e.g. a ball in a liquid may provide an angular velocity and/or angular acceleration sensor. Further, micromechanical acceleration sensors coupled subtractively in pairs may be used to sense angular acceleration. Angular acceleration may be converted to angular velocity by integration, providing that an initial angular velocity is known or estimated. Angular velocity may be converted to angular position by integration, providing that an initial angular position is known or estimated. The inertial sensor unit 250 provides movement information signal 141 to the control unit 100. The position of the first image 720 is adjusted according to the movement information signal 141.

Inertial sensors may exhibit drift, which may cause annoying shifting of the first image 720 to the side of the screen 600. Therefore, the control unit 100 may be adapted to shift the first image 720 slowly to a predetermined position, e.g. central position, when no angular velocity and/or acceleration is detected. The position of the first image 720 may also be adjusted via the control interface 120.

When using inertial sensors, any point which is stationary with respect to the earth may be interpreted to be an external reference, i.e. a basis for determining the magnitude of movements. However, the rotation of the earth corresponds to 15 degrees per hour, which may cause drifting and/or rotation of the first image 720 during long presentations when using highly accurate inertial sensors. The control unit may be coupled to a clock to compensate the effect.

The magnetic field of the earth may be used to provide angular position information. The projecting device 500 may comprise a compass to provide movement information.

In a further embodiment, a sensor unit may be adapted to provide absolute position information, i.e. three spatial coordinates and three angular coordinates which unambiguously define the absolute position of the projecting device 500 with respect to its environment. The sensor unit may be implemented e.g. by using four or more stationary external beacons which transmit accurately timed optical, acoustic or radio-frequency positioning signals to the projecting device 500. The sensor unit of the projecting device may comprise directionally sensitive detectors to sense the direction and the timing of the signals. The received signals can be converted to absolute position information by signal processing means.

The projecting device 500 may be used for image projection purposes in presentations before an audience, as a handheld device. The projecting device is advantageously lightweight and of small size such that it can be easily operated with one hand. The projecting device 500 may be used to project e.g. pages of text, numerical tables, graphical curves, photographs, or video sequences. A variety of surfaces may be used as external surfaces, such as a wall, the surface of a table, or the surface of a snow bank.

The projecting device 500 may also be used as a digital camera or digital video camera. The projecting device 500 may comprise a microphone to receive voice or sounds.

A mobile device may be adapted to project the first image 720 and the pointer pattern 730 according to the present invention. The projecting device 500 may be a mobile device or it may be incorporated in a mobile device. A mobile device may, for example, be a mobile phone, a personal digital assistant (PDA) device, a computer with wireless communication capabilities or a communicator.

The method according to the present invention may be implemented by means of a computer program comprising at least computer program code sections for controlling the projection of the first image 720 on the external surface. The computer program may be installed e.g. in a portable computer which controls a fixed combination of an image projector and a digital camera.

A computer program product may comprise said computer program. The computer program product may be e.g. a CR-ROM disc or a memory card comprising said program.

For a person skilled in the art, it will be clear that modifications and variations of the device, the system and the method according to the present invention are perceivable. The particular embodiments described above with reference to the accompanying drawings are illustrative only and not meant to limit the scope of the invention, which is defined by the appended claims.

What is claimed is:

1. A device for optically projecting at least a first image and a pointer pattern on an external surface, said device comprising:
    an image projecting unit for optically projecting at least said first image and said pointer pattern on said external surface,
    a sensor to provide movement information related to angular movement of said device with respect to said external reference,
    one or more actuators for mechanically adjusting the position of said first image, and
    a control unit to move the position of said first image with respect to said pointer pattern according to said movement information by using said one or more actuators such that the relative movement of said first image with respect to said external reference is substantially smaller than the relative movement of said pointer pattern with respect to said external reference.

2. The device according to claim 1, wherein said sensor is further adapted to provide absolute position information of said device.

3. The device according to claim 1, wherein said device further comprises:
    means to associate a position of said pointer pattern with an action option, which position is determined with respect to said first image,
    means to receive a command given by a user, and
    means to accept or reject said action option according to said user command.

4. The device according to claim 1, wherein an angular position of said pointer pattern is substantially fixed with respect to the exterior said device.

5. The device according to claim 1, wherein said control unit is adapted to keep the position of said first image substantially fixed with respect to said external reference.

6. The device according to claim 1 wherein the image projecting unit includes an emissive pointer unit for projecting said pointer pattern.

7. The according to claim 1, wherein said pointer pattern is adapted to be projected as an image.

8. The device according to claim 1, wherein said position of said first image is adapted to be adjusted by electronically moving a position of a primary image displayed on a micro display.

9. The device according to claim 1, wherein said one or more actuators are configured to mechanically move the projecting optics of the device.

10. The device according to claim 1, wherein said device further comprises wireless communication capabilities.

11. A method comprising:
    optically projecting at least a first image and a pointer pattern on an external surface using a handheld projecting device,
    providing movement information related to the angular movement of said projecting device with respect to an external reference, and
    mechanically adjusting the position of said first image with respect to said pointer pattern according to said movement information by using one or more actuators such that the relative movement of said first image with respect to said external reference is substantially smaller than the relative movement of said pointer pattern with respect to said external reference.

12. The method according to claim 11 further comprising providing information related to absolute position information of said handheld projecting device.

13. The method according to claim 11 further comprising
    moving said pointer pattern to a position, which position is determined with respect to said first image,
    associating said position with an action option,
    receiving a command given by a user, and
    accepting or rejecting said action option according to said user command.

14. The method according to claim 11 wherein an angular position of said pointer pattern is kept substantially fixed with respect to the exterior of said projecting device.

15. The method according to claim 11 wherein the position of said first image is kept substantially fixed with respect to said external reference.

16. The method according to claim 11 wherein said pointer pattern is projected by an emissive pointer unit.

17. The method according to claim 11, wherein said pointer pattern is projected using a combination of projecting optics and a micro display.

18. The method according to claim 11 wherein the position of said first image is adjusted by electronically moving a position of a primary image displayed on a micro display.

19. The method according to claim 11, wherein the position of said first image is adjusted by mechanically moving the projecting optics of the device.

20. The method according to claim 11 wherein said projecting device communicates with external apparatus.

21. A system comprising:
    a handheld projecting device for optically projecting a at least a first image and a pointer pattern on an external surface, and
    further apparatus for communicating with said projecting device,
    said projecting device in turn comprising:
    a sensor to provide movement information related to the angular movement of said projecting device with respect to an external reference,
    one or more actuators for mechanically adjusting the position of said first image, and
    a control unit to move the position of said first image with respect to said pointer pattern according to said movement information by using one or more actuators such that the relative movement of said first image with respect to said external reference is substantially smaller than the relative movement of said pointer pattern with respect to said external reference.

22. A computer program product for a projecting device, said projecting device being for optically projecting a first image and a pointer pattern on an external surface, said computer program product comprising at least computer program code sections stored on a readable medium, which when executed by a processor are for
    controlling the projection of at least said first image on said external surface,
    providing movement information related to the angular movement of said projecting device with respect to an external reference, and
    mechanically adjusting the position of said first image with respect to said pointer pattern according to said movement information by using one or more actuators such that the relative movement of said first image with respect to said external reference is substantially smaller than the relative movement of said pointer pattern with respect to said external reference.

23. A device comprising:
   image projecting means for optically projecting at least a first image and a pointer pattern on an external surface,
   a sensing means for providing movement information related to angular movement of said device with respect to an external reference,
   one or more actuating means for mechanically adjusting the position of said first image, and
   a control means for moving the position of said first image with respect to said pointer pattern according to said movement information by using said one or more actuating means such that the relative movement of said first image with respect to said external reference is substantially smaller than the relative movement of said pointer pattern with respect to said external reference.

24. The device of claim 23 wherein said image projecting means comprises separate means for projecting said pointer pattern.

25. A device comprising:
   an image projecting unit for optically projecting at least a first image on an external surface,
   a pointer unit for optically projecting a pointer pattern on said external surface,
   a sensor to provide movement information related to angular movement of said mobile device with respect to said external reference,
   one or more actuators for mechanically adjusting the position of said first image, and
   a control unit to move the position of said first image with respect to said pointer pattern according to said movement information by using said one or more actuators such that the relative movement of said first image with respect to said external reference is substantially smaller than the relative movement of said pointer pattern with respect to said external reference.

* * * * *

UNITED STATES PATENT AND TRADEMARK OFFICE
CERTIFICATE OF CORRECTION

PATENT NO. : 7,284,866 B2 Page 1 of 1
APPLICATION NO. : 11/030566
DATED : October 23, 2007
INVENTOR(S) : Buchmann It is certified that error appears in the above-identified patent and that said Letters Patent is hereby corrected as shown below:

1. At column 13, line 43, claim 7, line 1, please insert the word --device-- after the word "The".

Signed and Sealed this

Twenty-ninth Day of April, 2008

JON W. DUDAS
*Director of the United States Patent and Trademark Office*